Dec. 2, 1969  H. L. McCOY  3,481,620
FOUR WHEEL STEERING ARRANGEMENT FOR LAND VEHICLES
Filed Nov. 14, 1967  2 Sheets-Sheet 1

HUBERT L. McCOY
INVENTOR.

BY John G. Mills

ATTORNEY.

United States Patent Office 3,481,620
Patented Dec. 2, 1969

3,481,620
FOUR WHEEL STEERING ARRANGEMENT FOR LAND VEHICLES
Hubert L. McCoy, Rte. 3, Box 575,
Kannapolis, N.C. 28081
Filed Nov. 14, 1967, Ser. No. 682,927
Int. Cl. B62d 9/00, 7/06
U.S. Cl. 280—91   4 Claims

ABSTRACT OF THE DISCLOSURE

In abstract, a preferred embodiment of this invention is a proportional ratio second steering axle for load carrying vehicles in which, regardless of the load carried, will remain in proper proportional dirigible alignment.

---

Figure 1:
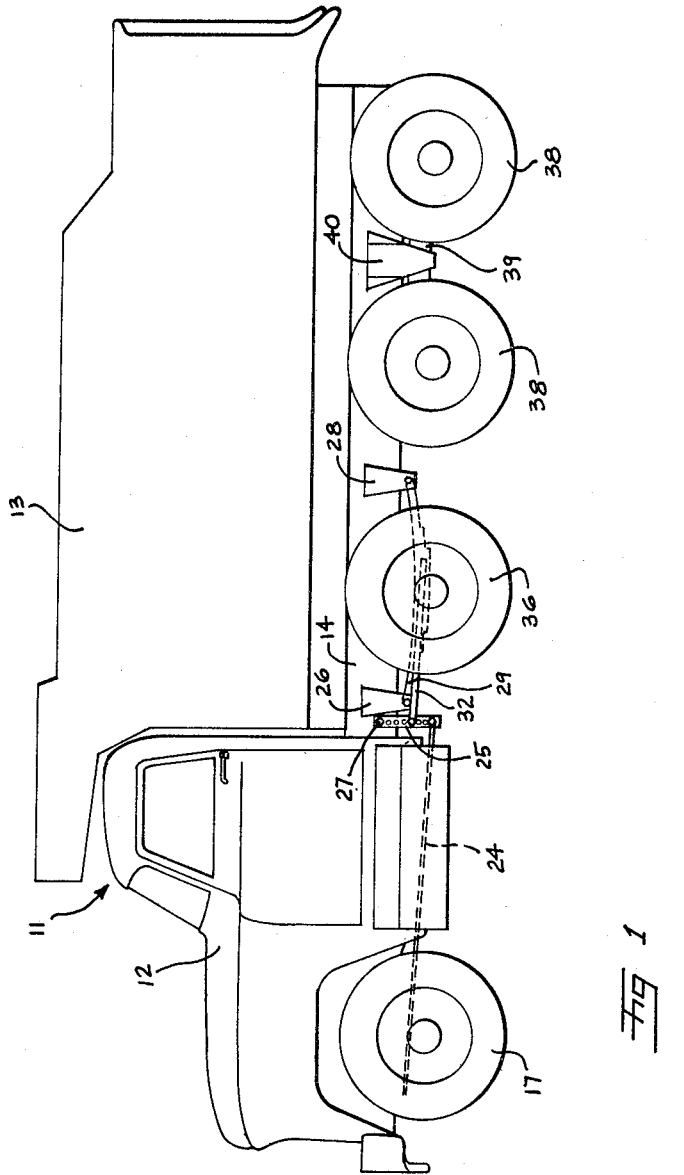

This invention relates to land vehicles and more particularly to second or auxiliary steering axles for long wheel base type trucks.

In the past, various attempts have been made to develop heavy load carrying land vehicles having the largest possible number of axles thereunder while at the same time remaining manageable.

In recent years, it has been found that one of the best means for hauling a combination of both heavy and light loads over rough, generally unimproved terrain as well as along highways, has been what is commonly known as the fully equalizing pulling tandem, long wheel base, straight truck which has two drive axles under a major portion of the load with a single steering axle in the front of the unit. These trucks, however, have been found less and less profitable to operate, particularly for contract haulers who are paid by weight alone, due to drastically reduced axle-weight limitations placed on public highways as well as increasing purchase and maintenance cost.

To increase the maximum legally permissible load of vehicles presently being used, attempts have been made to add a third weight bearing axle under the load portion thereof. These, sometimes known as triaxles because of the three sets of load bearing wheels, are presently commercially available on new trucks as well as in conversion kits to add the additional axle. Since most of these third axles are nonsteering, a total of three wheels in fixed alignment are on each side of the vehicle under the main portion of the load. This has been found to cause an excessive amount of wear on the tires and strain on the truck due to the dragging effect encountered during turns. Due to this effect, the steering of these units is greatly impaired thereby rendering the same dangerous to operate at best. Thus it can be readily seen that the nonsteering, third load bearing axle is of questionable value since excessive tire wear and excessive strain on the vehicle offset the increased weight carrying ability.

To overcome the above problems, a suspendable third axle has been added which can be raised or lowered by either air or hydraulic means generally operated from the cab of the truck. These, in addition to carrying a large weight penalty and being costly to install and maintain, are extremely unpopular with engineers and others interested in preventing highway damaging overloads since, as a practical matter, the third axle is used only when weight limitations are being checked by public officials.

Steerable third load bearing axles have been experimented with but up until now have proved unsatisfactory since the ratio of turn of the load bearing or added steerable axle must be less than the front wheels of the vehicle and such ratio must remain constant. To maintain the proper alignment between the two steering axles, various types of mechanical linkages between the same have been devised. None of these, however, have been adequate since vehicle springs are in almost all cases pivoted at their forward most end with a longitudinally moveable shackle at the rear suspension point thus allowing the spring to flex up and down in a straightening and bowing action which increases and decreases the distance between the axles. This has caused the steering axles that are aligned when the vehicle is empty to turn to a dragging configuration as the load is increased. Also, each time a bump or uneven terrain is encountered, the predetermined ratio of turning radius between the two sets of dirigible wheels varies from that originally set causing not only excessive wear on the tires but also producing a very dangerous vehicle control situation.

The present invention has been developed after much research and study into the above mentioned problems, particularly as encountered by long wheel base, straight trucks carrying heavy loads such as steel, concrete, ready-mix, stone, sand, soil, asphalt pavement, logs, pulpwood, bricks, block and the like. It is designed to allow additional axles to be used to boost legally allowable load limits while not adding substantially to the initial cost, maintenance or wear and tear on the vehicle. It also greatly increases the safety and control of the unit as well as increasing its efficiency and utility.

It is, therefore, an object of the present invention to provide a vehicle having at least two steerable axles which remain in relative fixed turning alignment regardless of variations in the weight of the load carried.

Another object of the present invention is to provide a load carrying vehicle having at least one nonsteerable axle and at least two adjacent steerable axles interlinked in such a manner that a predetermined alignment of coordinated radius of turn is maintained regardless of variations in weight of load or terrain.

A further object of the present invention is to provide a simple inexpensive mechanical linkage between at least two pairs of dirigible wheels so that once adjusted to a predetermined interconnected ratio of turn radius, the same will be maintained regardless of weight and terrain variations.

Another object of the present invention is to provide a steerable load carrying axle adapted to be readily connected to the existing steerable axle of a long wheel base type truck and which will remain in predtermined alignment therewith during operation under varying load conditions.

Another object of the present invention is to provide an inexpensive linkage between two steerable axles of a load carrying vehicle which will prevent variations in the ratio of turn between the same under varying loads.

Other objects and advantages of the present invention will become apparent and obvious from a study of the following descriptions and the accompanying drawings which are merely illustrative of the present invention.

Figure 2:
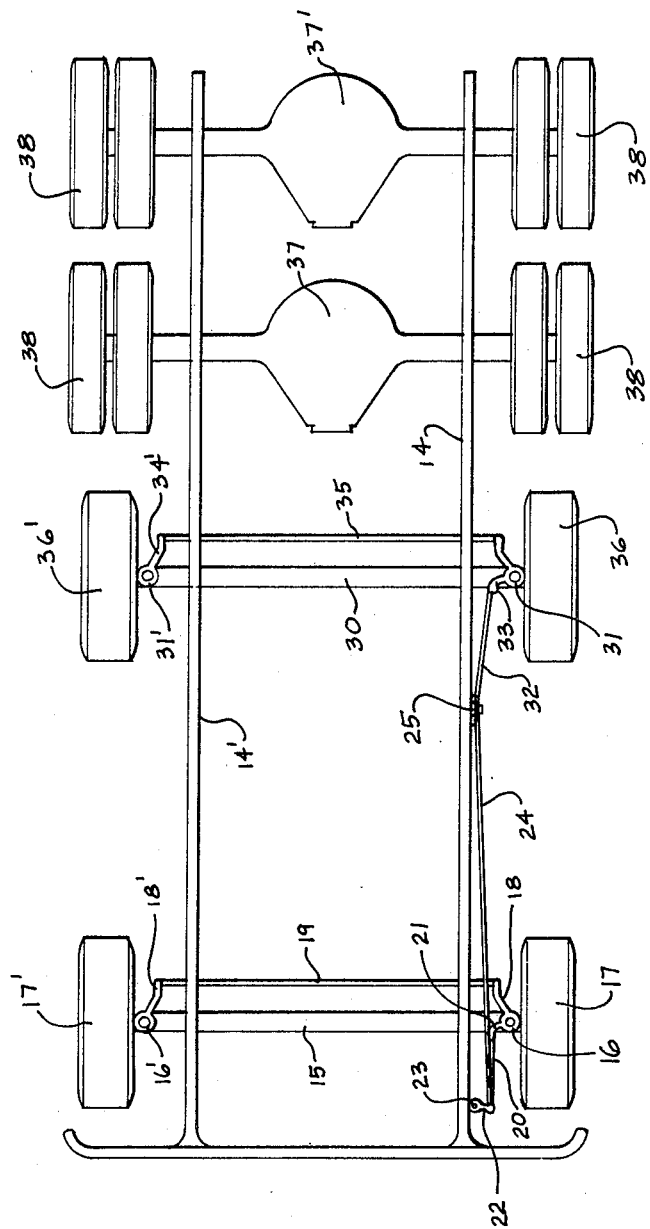

In the drawings:
FIG. 1 is a side elevational view of a high density load carrying vehicle incorporating applicant's invention; and
FIG. 2 is a top plan view of the frame and axles thereof.

With further reference to the drawings, a land vehicle indicated generally at 11 is provided having a cab 12 covering approximately the forward third of the vehicle with a load encompassing body 13 occupying the rear two-thirds thereof and projecting forwardly over a portion of said cab.

A pair of longitudinally disposed parallel frame members 14 and 14′ are provided upon which cab 12 and body 13 are mounted.

A pitman arm 22 is adapted to pivot about pivot point 23 when activated by the standard steering gear (not shown) of the vehicle. The end of pitman arm 22 opposite pivot point 23 is pivotably connected to the forward ends of forward drag link 20 and intermediate drag link 24. The rear portion of drag link 20 is pivotably connected to the outer end of intermediate knuckle arm 21. The other end of arm 21 is fixedly secured to steering knuckle 16 upon which is rotatively mounted dirigible wheel 17. This knuckle 16 is pivotably mounted on one end of axle 15 which in turn is resiliently mounted to frame members 14 and 14' by way of spring means (not shown).

Rearwardly projecting from and fixedly secured to knuckle 16 is a knuckle or steering arm 18. The outer end of arm 18 is pivotably connected to one end of tie rod 19. The other end of this tie rod is pivotably connected to the outer end of rearwardly projecting steering arm 18' which is fixedly secured at its other end to knuckle 16'. This knuckle is in turn pivotably mounted on the end of axle 15 opposite knuckle 16 and is adapted to rotatively mount dirigible wheel 17.

Intermediate drag link 24, which has hereinabove been described is pivotably secured at its forward end to pitman arm 22, has its opposite end pivotably secured to adjustable reducer arm 25. The upper end of arm 25 is pivotably connected to frame 14 immediately adjacent the forward spring hanger 26. This arm may be mounted by any convenient means such as pin 27.

Spring hanger 26 and spring shackle 28 support spring 29 in operatively relation to frame 14. An identical bracket, shackle and spring (none of which are shown) are fixedly secured to frame 14'. These springs mount, generally in their central portion, rear dirigible axle 30 which has knuckle 31 pivotably mounted on one end and knuckle 31' pivotably mounted on the other end.

Rear drag link 32 is pivotably mounted between reducer arm 25 and the outer end of rear intermediate knuckle arm 33. The other end of this is fixedly secured to knuckle 31. Rearwardly projecting from knuckle 31 is rear knuckle or steering arm 34 which is similar in configuration to steering arm 18. Rear tie rod 35 is pivotably connected between the outer ends of steering arms 34 and 34'. Dirigible wheels 36 and 36' are rotatively mounted on knuckles 31 and 31' respectively as herinabove described for the forward dirigible wheels 17 and 17'.

A pair of rear driven axles 37 and 37' are provided upon which are mounted nondirigible wheels 38. These wheels may be either singly or dually mounted. The same is true with the dirigible wheels 17, 17' and 36, 36'. It has been found through experience, however, advantageous to use oversize tires on the dirigible wheels rather than dual wheels because of the control factor and it has been found more economical to use dual rather than single oversize tires for the driven wheels 38. In any case, this is a matter of choice for the operator of the unit to determine.

Driven axles 37 and 37' are resiliently mounted to the lower portion of frame 14 by means such as spring 39 and spring hanger 40. Equivalent means (not shown) fixedly secured said axles to frame 14'.

In actual use of a vehicle incorporating the present invention, interconnected dirigible wheels 36 and 36' are placed in straight, nonturning alignment with the nondirigible wheels 38. Reducer arm 25 is aligned vertically so that it is generally perpendicular to frame 14. Drag link 32 is then adjusted longitudinally along reducer arm 25 until such link lies in a plane defined as horizontal along an axis parallel to the central lateral axis of the truck, such plane being parallel to the plane cutting the spring from a point adjacent the axle 30 to the pivoted spring end within hanger 26. Thus it can readily be seen that no movement will be imparted to knuckle 31 through arm 33 even though there are variations in load and terrain conditions since the flexing of spring 29 is paralleled in movement by drag link 32.

With dirigible wheels 17 and 17' aligned parallel to the longitudinal axis of the trucks, the length of intermediate drag link 24 may be adjusted in the usual manner to correspond to the distance between pitman arm 22 and reducer arm 25.

In view of the fact that the degree of turn relative to the longitudinal axis of the vehicle proportionally decreases for a given vehicle turn radius as the wheel base is shortened, the wheels on dirigible axle 15 will have a larger degree of turn than the wheels on dirigible axle 30. To use the same pitman arm to control the steering of both dirigible axles while allowing for the proportional difference of degrees of turn of the different length wheel base dirigible axles, drag link 24 will be adjusted longitudinally along compensating arm 25 until the exact proportional alignment of the two axles is accomplished. As is obvious, particularly in FIG. 1, the closer drag links 24 and 32 are placed on arm 25, the more nearly the degree of turn between the two dirigible axles will be; and conversely, the further these drag links are placed apart, the greater the forward degree of travel will be as compared to the rear axle degree of turn.

Once the tie rod links have been adjusted in normal fashion to properly align each of the pairs of wheels and the drag links are properly adjusted as hereinabove described for coordinated turns between the dirigible axles, the unit is ready for operation. In the normal manner, whenever the steering gear (not shown) of the truck is activated to move pitman arm 22 either forwardly or rearwardly, drag links 20 and 24 will move accordingly and through arm 21, knuckle 16 and tie rod 19 the front steerable wheels are controlled while at the same time, through reducer arm 25, drag link 32, arm 33, knuckle 31 and tie rod 35, the intermediate steerable wheels are coordinated into a lesser degree of turn.

Although two driven axles 37 and 37' are shown and described, it is obvious that this number may be reduced to one nonsteerable driven axle. It is also obvious that two or more intermediate dirigible axles could be incorporated into a vehicle by utilizing applicant's invention. Additionally, it is apparent that even though long wheel base trucks have been described, the present concept could be equally adapted to short wheel base trucks and similar vehicles.

It is obvious that the present invention has the advantages of allowing a standard steerable axle which is readily available in the market place to be attached beneath the load bearing area of a vehicle and controlled in accurate proportionally coordinated turns with one or more additional dirigible axles. The present invention has the further advantage of providing an emergency backup steering system wherein should one of the steerable axles fail it will caster thereby allowing the other axle to control due to the fact that both axles are operated from the same pitman arm. Applicant's invention also is extremely simple and inexpensive to both manufacture and install while at the same time providing an accurate, nonvarying means for proportionally controlling two or more dirigible axles spaced along the longitudinal axis of a vehicle.

The terms "upper," "lower," "forward," "rearward" and so forth have been used herein merely for convenience of the foregoing specification and in the appended claims to describe the vehicle steering means and its parts as oriented in the drawings. It is to be understood, however, that these terms are in no way limiting to the invention since the vehicle may obviously operate and be disposed in many different attitudes when in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. In a land vehicle having at least one dirigible and one nondirigible axle laterally disposed in spaced relation along the longitudinal axis of such vehicle with a pivotable pitman arm operatively controlling, through a forward drag link, the steering mechanism of said dirigible axle, the improvement comprising: the addition of a second dirigible axle mounted on leaf type springs and having a steering mechanism; at least one pivotable spring hanger connecting at least one of the springs of said added dirigible axle to said vehicle; and adjustable reducer arm pivotably connected to said vehicle at a point adjacent said hanger; an intermediate drag link adjustably and operatively connected between said pitman arm and said reducer arm; a rear drag link operatively and adjustably connected from a point on said reducer arm intermediate the connection point of said intermediate drag link and the vehicle pivot point to the steering mechanism of said added dirigible axle; said rear drag link being disposed generally in a plane cutting the spring from a point adjacent the axle to the pivoted spring end supported by said hanger whereby proportional turning alignment between the two dirigible axles may be accomplished and maintained regardless of variations in load and terrain conditions.

2. The vehicle of claim 1 wherein the point of connection of the intermediate drag link to the reducer arm is longitudinally adjustable along such arm.

3. The vehicle of claim 1 wherein the point of connection of rear drag link to the reducer arm is longitudinally adjustable along such arm.

4. A land vehicle comprising: at least two dirigible and one nondirigible axle means laterally disposed in spaced relation along the longitudinal axis of such vehicle, the intermediate dirigible axle being steeringly controlled through the use of a drag link to a lesser degree than the dirigible axle further from the nondirigible axle; leaf type springs mounting the intermediate dirigible axle; spring hangers pivotably mounting one end of each of said springs fixedly secured to and depending from said vehicle; the length of said drag link being adjusted to approximately the same length as the distance between the point the intermediate dirigible axle is mounted on its springs and the pivoted end of such springs; said drag link being generally disposed in a plane cutting the spring from a point adjacent the axle to the pivoted spring end supported by said hanger whereby proportional turning alignment between the dirigible axles may be maintained regardless of variations in load and terrain.

References Cited
UNITED STATES PATENTS

| | | | |
|---|---|---|---|
| 1,666,104 | 4/1928 | McMurtrie | 280—93 |
| 1,747,580 | 2/1930 | Fageol. | |
| 1,818,902 | 8/1931 | Marcum | 280—91 |
| 1,871,432 | 8/1932 | Fageol | 280—91 |
| 1,975,263 | 10/1934 | Fageol | 280—93 |
| 2,638,355 | 5/1953 | Spangler | 280—81.5 |

KENNETH H. BETTS, Primary Examiner